(12) United States Patent
Grohmann et al.

(10) Patent No.: US 8,806,730 B2
(45) Date of Patent: Aug. 19, 2014

(54) MOUNTING RAIL FOR MOUNTING AND POSITIONING A SEAL

(75) Inventors: Klaus Grohmann, Hersdorf (DE); Lothar Thommes, Bitburg (DE)

(73) Assignee: Grohmann Engineering GmbH, Prum (DE)

( * ) Notice: Subject to any disclaimer, the term of this patent is extended or adjusted under 35 U.S.C. 154(b) by 103 days.

(21) Appl. No.: 13/497,018

(22) PCT Filed: Apr. 15, 2011

(86) PCT No.: PCT/EP2011/056018
§ 371 (c)(1),
(2), (4) Date: Mar. 19, 2012

(87) PCT Pub. No.: WO2011/131583
PCT Pub. Date: Oct. 27, 2011

(65) Prior Publication Data
US 2012/0174364 A1    Jul. 12, 2012

(30) Foreign Application Priority Data

Apr. 23, 2010  (DE) .......................... 10 2010 018 298

(51) Int. Cl.
B25B 27/14     (2006.01)
B23P 11/02     (2006.01)
E06B 7/22      (2006.01)
B60J 10/00     (2006.01)

(52) U.S. Cl.
CPC .......... B60J 10/0088 (2013.01); B60J 10/0074 (2013.01)
USPC ........... 29/281.5; 29/450; 29/281.4; 49/498.1

(58) Field of Classification Search
USPC ............. 29/281.5, 451, 450, 281.4; 49/498.1, 49/493.1
See application file for complete search history.

(56) References Cited

U.S. PATENT DOCUMENTS

| | | | | |
|---|---|---|---|---|
| 3,747,275 A * | 7/1973 | May et al. | | 49/477.1 |
| 4,093,287 A * | 6/1978 | Canter | | 292/317 |
| 4,334,435 A * | 6/1982 | Tkatschenko et al. | | 73/864.86 |
| 4,653,166 A * | 3/1987 | Bright | | 29/235 |
| 4,813,458 A * | 3/1989 | Jacobucci | | 15/236.02 |
| 5,048,170 A * | 9/1991 | Kuppers | | 29/235 |
| 5,121,532 A * | 6/1992 | Massie | | 29/235 |
| 6,818,069 B1 * | 11/2004 | Hinton | | 134/19 |
| 8,322,005 B2 * | 12/2012 | Buse et al. | | 29/235 |
| 8,336,184 B2 * | 12/2012 | Yamamoto et al. | | 29/428 |

(Continued)

FOREIGN PATENT DOCUMENTS

| | | |
|---|---|---|
| EP | 0 849 106 | 6/1998 |
| FR | 2 934 554 | 2/2010 |
| WO | WO 2007/082915 | 7/2007 |

*Primary Examiner* — Lee D Wilson
*Assistant Examiner* — Alvin Grant
(74) *Attorney, Agent, or Firm* — Lucas & Mercanti, LLP

(57) ABSTRACT

The invention relates to a mounting rail (8) for mounting and positioning a seal, having attachment devices (12) disposed on a longitudinal side (15) of the mounting rail and each separated from each other by an interruption (13). In order to propose a mounting rail comprising high flexibility allowing simple insertion of the seal even after a long period of use and allowing more uniform pressure distribution when pressing on the seal, the invention proposes that the mounting rail (8) comprises a web (19) running through on the other longitudinal side (16), and at least one opening (1ha-c) is disposed in the mounting rail between the web and each attachment device.

9 Claims, 2 Drawing Sheets

(56) References Cited

U.S. PATENT DOCUMENTS

| | | | |
|---|---|---|---|
| 2002/0133929 A1* | 9/2002 | Miura et al. | 29/451 |
| 2003/0111494 A1* | 6/2003 | Lin et al. | 222/505 |
| 2004/0216385 A1* | 11/2004 | Raisch | 49/493.1 |
| 2005/0193544 A1* | 9/2005 | Supina et al. | 29/450 |
| 2005/0226780 A1* | 10/2005 | Sandell et al. | 422/99 |
| 2005/0232818 A1* | 10/2005 | Sandell et al. | 422/99 |
| 2006/0011305 A1* | 1/2006 | Sandell et al. | 156/542 |
| 2006/0042170 A1* | 3/2006 | Furuzawa et al. | 49/489.1 |
| 2006/0055124 A1* | 3/2006 | Wolff et al. | 277/650 |
| 2006/0070224 A1* | 4/2006 | Gratien et al. | 29/451 |
| 2006/0230686 A1* | 10/2006 | Plum et al. | 49/498.1 |
| 2009/0214811 A1* | 8/2009 | Sandell et al. | 428/41.8 |
| 2012/0023721 A1* | 2/2012 | Glachet | 29/281.5 |

* cited by examiner

MOUNTING RAIL FOR MOUNTING AND POSITIONING A SEAL

CROSS-REFERENCE TO RELATED APPLICATIONS

This is a U.S. national stage of application No. PCT/EP2011/056018 filed Apr. 15, 2011. Priority is claimed on German Application No. 1020 10018298.2 filed Apr. 23, 2012, the content of which is incorporated herein by reference in its entirety.

BACKGROUND OF THE INVENTION

1. Field of the Invention

The invention pertains to a mounting rail for holding and positioning a sealing strip, the rail being provided with attachment devices, which are arranged along one of the long sides of the mounting rail and which are separated from each other by gaps. These types of mounting rails are used in particular in systems for applying self-adhesive sealing strips to the doors of motor vehicles.

2. Description of the Related Art

The sealing strip for a motor vehicle door is applied by arranging its self-adhesive surface around the periphery of the door and by then pressing it down. The automated steps of applying and pressing down the sealing strip are carried out by an application system for self-adhesive sealing strips, which comprises a plurality of mobile units, each with its own contour element, wherein each mobile unit can be moved back and forth in a direction essentially perpendicular to its assigned section of the adhesion surface on the door of the motor vehicle. Because, at least in some cases, the mobile units move in different directions, each mobile unit has its own mounting rail, which can be moved independently of the mounting rails of the neighboring mobile units.

To install the sealing strip, it is first set down onto the mounting rails arranged around the periphery of the door and held in place by a support element such as an undercut. Then the entire application system, including the mobile units, is moved toward the vehicle door until the mobile units, with the sealing strip mounted on them, are located a defined distance away from the adhesion surface of the vehicle door. Then the self-adhesive surface of the slightly expanded sealing strip is moved toward the adhesion surface and positioned here. Finally, the sealing strip is pressed against the adhesion surface on the door by pressing devices at a defined pressure.

The applicant's application systems of this type for sealing strips have been in use in the automotive industry since 1987. At the beginning, the individual mounting rails were made of spring plate. One of the long sides of each plate was provided with comb-like slots extending from the side, whereas holes were provided along the other long side, so that the mounting rail could be screwed to the contour elements carried on the mobile units.

In some cases, the flexibility of the known mounting rails made of spring plate and provided with comb-like slots was no longer sufficient as the contours of motor vehicle doors and thus the contours of the adhesion surfaces became more complicated. In modern door geometries, especially in the transition area to the window frame, the mounting rails can lack sufficient flexibility, especially in the plane of the mounting rail.

To avoid the need to fabricate individual and therefore expensive mounting rails for these types of problem areas, a mounting rail is described in EP 0 849 106 B1, which consists of a continuous strip of plastic material with a serpentine shape when looked at from above. The serpentine-shaped strip comprises attachment devices along one of its long sides, these devices being separated from each other by gaps, whereas, on the other side, the legs and webs of the serpentine-shaped strip form spring tongues. The sealing strips to be applied are set down onto the spring tongues. Because of the serpentine shape of the continuous strip, the mounting rail is extremely flexible and fits any door contour, even in the problem areas which demand a high degree of flexibility from the mounting rail. The flexibility attributable to the serpentine shape makes it possible to lay only a single continuous mounting rail over the contour elements and to screw it in position there as usual.

The advantage of the high flexibility attributable to the serpentine shape, however, is obtained at a certain cost; that is, it leads to the disadvantage that it can be difficult to set the sealing strip down onto the spring tongues, because, over the course of time, the spring tongues may no longer line up properly with each other because of material fatigue. Material fatigue in combination with the high flexibility of the serpentine-shaped mounting rail, furthermore, can also lead to an unequal pressure distribution when the self-adhesive strip is pressed onto the adhesion surface.

SUMMARY OF THE INVENTION

Proceeding from these prior arts, the invention is based on the goal of proposing a mounting rail which comprises high flexibility for the application of sealing strips even in the problem areas of modern door geometries; onto which, even after prolonged use, the sealing strip can also be easily set down; and which ensures a more uniform pressure distribution when the sealing strip is pressed into place.

This goal is achieved for a mounting rail of the type described above in that the mounting rail comprises a continuous web on the other side, i.e., on the long side opposite the attachment devices, and in that at least one opening is provided in the mounting rail between the web and each fastening device.

The surprising discovery was made that the openings in the mounting rail provide the high flexibility required for the application of sealing strips even in the problem areas. In particular, the inventive mounting rail offers sufficient flexibility even in the plane of the mounting rail. The flexibility of the mounting rail around an axis lying in its plane results from the springy properties of the material of the mounting rail. Plastic is preferably used as the material. In contrast to the continuous mounting rail according to EP 0 849 106 B1, however, each mobile unit of the application system is equipped with its own mounting rail.

The continuous web of the mounting rail makes it easier the set the sealing strip down onto the rail, because the design of the inventive mounting rail excludes the possibility that the spring tongues will not align properly with each other. The continuous web opposite the attachment devices, furthermore, promotes a uniform pressure distribution when the sealing strip is pressed against the adhesion surface.

Because the material fatigue of the inventive mounting rail has no effect on the mounting of the sealing strip on the rail and has practically no effect on the uniformity of the pressure distribution, the intervals at which the mounting rails must be replaced are increased, as a result of which the operating costs of the application system are lowered, and the periods during which the system must be idled for maintenance are reduced.

According to an advantageous embodiment of the invention, each attachment device for attaching the mounting rail to the contour element comprises at least one fastening hole.

Each attachment device of the mounting rail is preferably formed by a single fastening hole for accepting a screw, as is the also the case with the known mounting rails.

During the testing of the inventive mounting rail, it was found to be advantageous to assign several openings in the mounting rail, especially elongated openings with parallel long sides, to each attachment device. Designing these openings so that their sides converge in the direction toward the assigned attachment device improves the flexibility of the mounting rail in its plane, especially in combination with the gaps present between the attachment devices.

All of the elongated openings, on the side facing away from the attachment devices, terminate at the level of the continuous web. The gaps between the attachment devices also extend to a point no farther than the web of the mounting rail.

The gaps, which start out in the form of slits, expand as they proceed from the web toward the long side of the mounting rail with the attachment devices. The geometry of this expansion makes it possible to optimize the stress distribution in the mounting rail.

As known from the prior art, the inventive mounting rail also preferably comprises a support element, which can be in the form of a recess, to ensure that the sealing strip is held reliably in place.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of the drawings.

DESCRIPTION OF THE PREFERRED EMBODIMENTS

Figure 1:
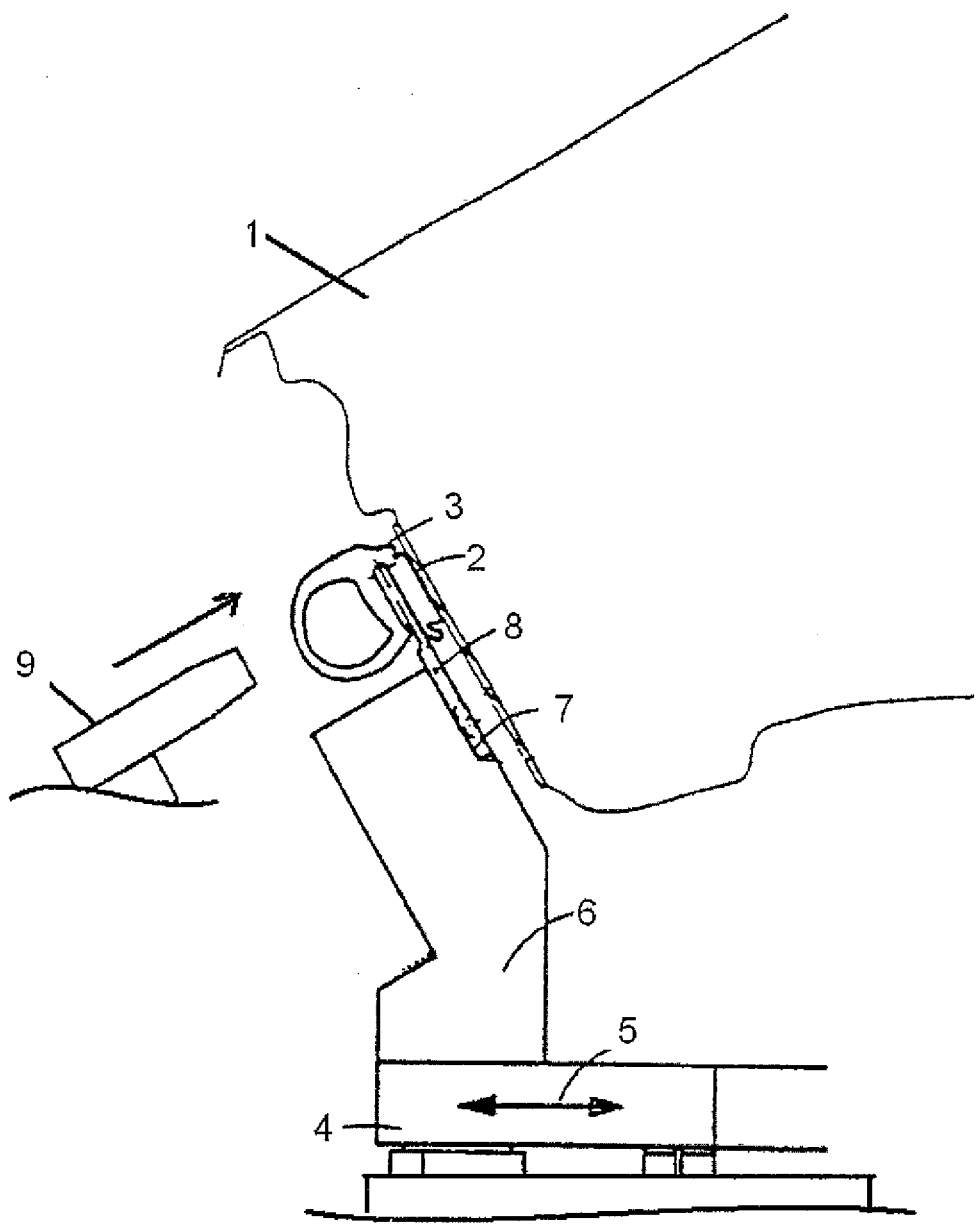
FIG. 1 is a partial side view of a mobile unit with its contour element and a pressing device of an application system, by means of which a sealing strip can be installed on a motor vehicle door.

FIG. 1 shows part of a motor vehicle door 1 with an adhesion surface 2 extending around the periphery, to which a sealing strip 3 is to be applied. This is done by means of an application system, to which a plurality of mobile units 4 belongs, which are arranged next to each other in such a way as to follow the contour of the door. Each mobile unit 4 can be moved back and forth in the direction of the double arrow 5, wherein the direction of movement of each mobile unit 4 is toward its assigned section of the door contour and thus of the adhesion surface 2. A contour element 6 with a contour surface 7 is fastened to the mobile unit 4. To this contour surface 7, a mounting rail 8 is screwed, which projects beyond the contour surface 7, and onto the free edge of which the sealing strip 3 is pushed.

To apply the sealing strip 3, the sealing strip is set down onto the mounting rail 8. Then the mobile units 4 are moved so that the sealing strip 3 is brought into a predetermined position with respect to the adhesion surface 2. Then the sealing strip 3 is pressed with a predetermined amount of force against the adhesion surface 2 by a pressing device 9.

Figure 2:
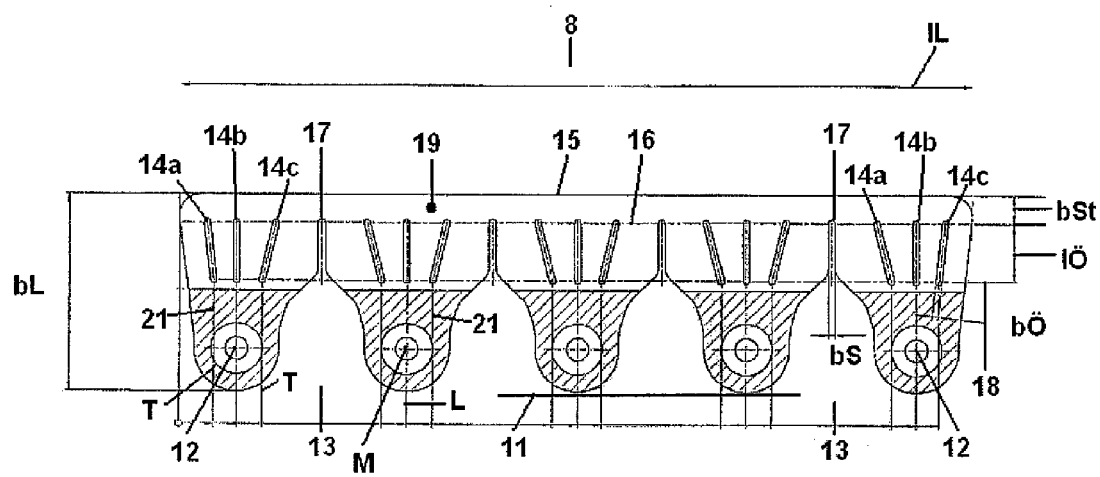
FIG. 2 is a top view of an inventive mounting rail.
Figure 3:
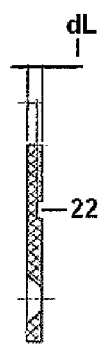
FIG. 3 is a cross section through the mounting rail according to FIG. 2.

The details of the mounting rail 8 merely indicated in FIG. 1 can be seen more clearly in FIGS. 2 and 3. The mounting rail 8, which consists of flat plastic material, comprises five attachment devices 12 in the form of holes arranged along one of the long sides 11. The holes are separated from each other by gaps 13.

Three openings 14a-c in the form of slots are assigned to each attachment device 12.

The slots end a certain distance away from the other long side 15 at the level of a line 16 extending in the longitudinal direction of the mounting rail; this line forms the boundary between a continuous web 19 and the long side 11. Part of the gap 13 is designed in the form of a slit 17 with the width $b_s$; this slit extends up as far as the line 16. As it proceeds toward the long side 11, the slit expands to form a cup-like shape. At the level of another line 18 extending in the longitudinal direction of the mounting rail 8, the openings 14a-c in the form of slots terminate a certain distance away from the attachment devices (12).

The ratio of the length $l_S$ of the slots to their width $b_S$ in the exemplary embodiment shown here is approximately 9:1. The ratio of the length $l_S$ of the slots to the width $b_{St}$ of the web is approximately 2:1

The slots converge toward each other in the direction of the attachment hole 12 in such a way that tangents T to the attachment hole extending perpendicular to the long side pass through the narrow sides of the two outer slots 14a, 14c pointing toward the long side 11, whereas the line L proceeding perpendicular to the long side 11 and through the center M of the attachment hole passes through the narrow side of the slot 14b in the middle.

The geometric relationships described above were established over the course of a series of experiments with a mounting rail 8 with a length $l_L$ of approximately 110 mm and a width $b_L$ of approximately 30 mm.

The invention is not, however, limited to the arrangement and design of the openings 14a-c between the web 19 and each attachment device 12 as illustrated in the exemplary embodiment and described above. In particular, the elongated openings 14a-c can also follow a curve, have a different ratio of length to width, and be different with respect to how many of them are assigned to an individual attachment device 12.

It can be seen from FIG. 3 that the thickness $d_L$, of the mounting rail is relatively small in relation to its length $l_L$ 11, so that sufficient flexibility is obtained not only for flexure of the mounting rail in its plane but also for flexure of the mounting rail around an axis in its plane. In the case of a mounting rail length $l_L$ of approximately 110 mm shown here, the thickness $d_L$ will be, for example, 2 mm.

A longitudinal groove 22 as a support element for the sealing strip 3 is introduced into the rear surface of the mounting rail 8 above the attachment sections 21 separated from each other by the gaps 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mounting rail for holding and positioning a sealing strip, the rail comprising:
    two long sides extending between two ends of the rail,
    attachment devices arranged along one of the long sides of the mounting rail and which are separated from each other by gaps, and
    a continuous web on the other of the long sides,
    wherein at least one opening is arranged in the mounting rail between the web and each respective attachment device.

2. The mounting rail according to claim 1, wherein the each respective attachment device comprises at least one fastening hole.

3. The mounting rail according to claim 1, wherein a plurality of openings in the mounting rail are arranged between the each respective attachment device and the web.

4. The mounting rail according to claim 3, wherein the openings in the mounting rail are elongated, and each of the openings extends longitudinally from the attachment device to the web.

5. The mounting rail according to claim 4, wherein the openings are slots.

6. The mounting rail according to claim 4, wherein the openings converge as they proceed toward the each respective attachment device.

7. The mounting rail according to claim 1, wherein the gaps expand as they proceed toward the one of the long sides of the mounting rail.

8. The mounting rail according to claim 1, wherein the mounting rail is made of plastic.

9. An application system for applying sealing strips to the doors of motor vehicles, comprising several mobile units, each of the mobile units having a contour element, which can be moved toward and away from an adhesion surface on the door of the motor vehicle, wherein a mounting rail is fastened to each of the contour elements, the mounting rail comprising:
    two long sides extending between two ends of the rail,
    attachment devices arranged along one of the long sides of the mounting rail and which are separated from each other by gaps, and
    a continuous web on the other of the long sides,
    wherein at least one opening is arranged in the mounting rail between the web and each respective attachment device.

* * * * *